United States Patent [19]

Hardy et al.

[11] Patent Number: 4,853,143

[45] Date of Patent: Aug. 1, 1989

[54] BLEACH ACTIVATOR COMPOSITIONS CONTAINING AN ANTIOXIDANT

[75] Inventors: Frederick E. Hardy; Frank Cselik, both of Newcastle upon Tyne, England; Alastair J. Pretty, Overijse, Belgium; Kenneth Young, Englefield Green; Gerald Scott, Lichfield, both of England

[73] Assignee: The Procter & Gamble Company, Cincinnati, Ohio

[21] Appl. No.: 168,723

[22] Filed: Mar. 16, 1988

[30] Foreign Application Priority Data

Mar. 17, 1987 [GB] United Kingdom ................. 8706273

Dec. 9, 1987 [GB] United Kingdom ................. 8728727

[51] Int. Cl.[4] ........................ C09K 15/08; C11D 3/20; C11D 3/39; C11D 3/395

[52] U.S. Cl. .................................. 252/102; 252/89.1; 252/90; 252/95; 252/99; 252/174; 252/174.13; 252/182.29; 252/186.25; 252/186.31; 252/186.38; 252/404; 252/524; 252/542

[58] Field of Search ...................... 252/186.25, 186.31, 252/186.38, 404, 95, 99, 90, 102, 174.13, 89.1, 174, 524, 542, 182.29

[56] References Cited

U.S. PATENT DOCUMENTS

| | | | |
|---|---|---|---|
| 3,130,165 | 4/1964 | Brocklehurst | 252/99 |
| 3,511,783 | 5/1970 | Waring | 252/117 |
| 4,087,369 | 5/1978 | Wevers | 252/102 |
| 4,100,095 | 7/1978 | Hutchins et al. | 252/99 |
| 4,119,660 | 10/1978 | Hutchins | 260/502 R |
| 4,126,573 | 11/1978 | Johnston | 252/99 |
| 4,167,487 | 9/1979 | Gray | 252/102 |
| 4,290,903 | 9/1981 | MacGlip | 252/91 |
| 4,412,934 | 11/1983 | Chung et al. | 252/186.38 |
| 4,421,668 | 12/1983 | Cox | 252/174.12 |
| 4,444,674 | 4/1984 | Gray | 252/95 |
| 4,486,327 | 12/1984 | Murphy | 252/94 |
| 4,536,314 | 8/1985 | Hardy et al. | 252/102 |
| 4,539,130 | 9/1985 | Thompson | 252/94 |
| 4,552,682 | 11/1985 | Black | 252/186.26 |
| 4,678,594 | 7/1987 | Parfomak | 252/186.31 |

FOREIGN PATENT DOCUMENTS

| | | |
|---|---|---|
| 635620 | 1/1962 | Canada . |
| 0068547 | 1/1983 | European Pat. Off. . |
| 0099197 | 1/1984 | European Pat. Off. . |
| 0120591 | 10/1984 | European Pat. Off. . |
| 0163331 | 12/1985 | European Pat. Off. . |
| 0209228 | 1/1987 | European Pat. Off. . |
| 864798 | 3/1958 | United Kingdom . |

*Primary Examiner*—Dennis Albrecht

*Attorney, Agent, or Firm*—Donald E. Hasse; Richard C. Witte; Thomas H. O'Flaherty

[57] ABSTRACT

Bleach activator, bleach and detergent compositions comprising:

(a) a peroxyacid bleach precursor having the general formula I $$Ac\text{—}L \qquad \text{I}$$

wherein Ac is the acyl moiety of an organic carboxylic acid comprising an optionally substituted, linear or branched $C_6$-$C_{20}$ alkyl or alkenyl moiety or a $C_6$-$C_{20}$ alkyl-substituted aryl moiety and L is a leaving group, the conjugate acid of which has a pKa in the range from 4 to 13, and (b) an antioxidant.

The compositions combine excellent stability, substrate-safety, water-dispersibility, granulometry and detergency performance.

6 Claims, No Drawings

BLEACH ACTIVATOR COMPOSITIONS CONTAINING AN ANTIOXIDANT

TECHNICAL FIELD

The present invention relates to bleach activator compositions. In particular, it relates to bleach activator compositions based on organic peroxy acid bleach precursors and to the use thereof in bleaching and detergent compositions. The bleaching compositions provide safe and effective peroxygen bleaching of textiles over a wide range of temperatures, washing conditions, washing machine and fabric types.

BACKGROUND

The removal of oxidisable stains from either hard surfaces or fabrics by means of peroxygen bleaches at temperatures less than about 60° C. is a well known technique and customarily involves the use of organic peroxy acids. The most commonly used peroxy acid is peracetic acid, normally generated in situ in the bleaching or laundry liquor by the reaction of alkaline hydrogen peroxide with a peroxy acid precursor (the so-called bleach activator). However, peroxyacids containing more than 2 carbon atoms in the acyl group have also been disclosed and taught for this purpose and GB-A-864,798, CA-A-635,620, U.S. Pat. No. 4,100,095, U.S. Pat. No. 4,119,960, U.S Pat. No. 4,126,573, EP-A-0,068,547 and EP A-0,120,591 all relate to the formation, stabilisation or use of such materials.

Recently, as described in EP-A-0,068,547 and EP-A-0,120,591 it has been found that selection of the chainlength of the aliphatic moiety of the peroxy acid permits the peroxy acid to be concentrated in the area where stain removal is required. Thus, whereas for removal of fugitive dyestuffs in bulk solution, a 'hydrophilic' bleach species is satisfactory, for stains on solid surfaces a bleaching species showing more hydrophobic character, and hence a tendency to migrate to the solid-liquid interface, may be more beneficial. In EP-A-0,068,547 and EP-A-0,120,591, bleach activator compositions which generate these so-called "hydrophobic" bleaching species are described in detail.

It has now been found that under certain usage conditions, bleaches and bleach activators of the "hydrophobic" class can have an adverse effect on certain varieties of water-insoluble polymer-based substrates, typically those containing unsaturated moieties or having a high degree of polymer cross-linking. Although the reasons for this are not fully understood, the effect appears to be associated with a side-reaction to the main bleaching process involving a single-electron, free radical mechanism.

The present invention therefore provides bleaching and detergent compositions incorporating a hydrophobic bleach activator component and which is safe and effective to use over the full range of usage conditions and substrate types, inclusive of those containing unsaturated or cross-linked polymeric moieties.

SUMMARY OF THE INVENTION

According to the present invention, there is provided a bleach activator composition comprising:

(a) a peroxyacid bleach precursor having the general formula I

Ac—L     I wherein Ac is the acyl moiety of an organic carboxylic acid comprising an optionally substituted, linear or branched $C_6$–$C_{20}$ alkyl or alkenyl moiety or a $C_6$–$C_{20}$ alkyl-substituted aryl moiety and L is a leaving group, the conjugate acid of which has a pKa in the range from 4 to 13, and (b) an antioxidant.

The bleach activator compositions herein contain as essential components, a hydrophobic peroxy acid bleach precursor (bleach activator) and an antioxidant or a free radical scavenger or inhibitor. Preferably, the bleach activator comprises from about 50% to about 99.9%, more preferably from about 60% to about 95% by weight of the bleach activator composition, while the antioxidant or free radical inhibitor comprises from about 0.1% to about 50%, more preferably from about 0.5% to about 10% by weight of the bleach activator composition.

Preferred antioxidants for use herein belong to the phenolic or phenolic ester classes although other varieties or antioxidant such as the hindered-amine light stabilizers based on 2,2,6,6-tetramethyl-piperidine derivatives or 1,2-dihydro-2,2,4-trimethylquinoline derivatives are also suitable herein.

Among the phenolic antioxidants, preferred for use herein are those compounds having the general formula II:

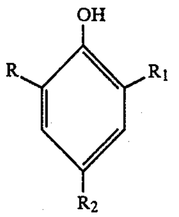

II wherein R is selected from H, OH, $C_1$–$C_{18}$ alkyl and alkenyl, $C_5$–$C_8$ cycloalkyl, aryl, aralkyl, araloxyalkyl or arylthioalkyl each having up to 4 carbon atoms in the alkyl moiety, said cycloalkyl and aryl moieties being unsubstituted or substituted by one or more identical or different substituents selected from $C_1$–$C_4$ alkyl and alkoxy groups: $R_1$ is selected from H, OH, $C_1$–$C_{18}$ alkyl and benzotriazole and aminotriazine derivatives; and $R_2$ is selected from H, OH, $CO_2H$ and salts and esters thereof, benzotriazole and aminotriazine derivatives, $C_1$–$C_{18}$ alkyl and alkenyl, $C_1$–$C_4$ alkylthio and $C_1$–$C_4$ alkyl thio-($C_1$–$C_4$)-alkylene, and $C_1$–$C_4$ alkyloxy, said alkyl or alkenyl moieties being unsubstituted or substituted by one or more $C_1$–$C_4$ alkoxy moieties or by one or ore carboxylic or phosphonic acid moieties or salts or esters thereof. Preferably, however, when both R and $R_1$ are H, $R_2$ represents OH or a $C_1$–$C_4$ alkyloxy moiety.

In the compound of formula II, R is preferably selected from methyl, ethyl, isoprpyl, sec-butyl, t-butyl, t-amyl, 1,1,3,3-tetramethylbutyl, α,α-dimethylbenzyl, cyclohexyl and 1-methylcyclohexyl, $R_1$ is preferably selected from H, methyl, ethyl isopropyl, sec-butyl and t-butyl; and $R_2$ is preferably selected from OH, methyl, ethyl, isopropyl, sec-butyl, t-butyl, t-amyl, 1,1,3,3-tetramethylbutyl, α,α-dimethylbenzyl, $—CH_2CO_2M$, $—CH_2CH_2CO_2M$, $—CH_2SCH_2CO_2M$, and $—CH_2SCH_2CH_2CO_2M$ wherein M is selected from H, alkali metal and alkaline earth metal and ammonium cations and $C_{1\text{-}18}$ alkyl and alkenyl ester moieties. In highly preferred embodiments both R and $R_1$ are t-alkyl moieties branched on the alpha carbon, especially t-butyl moieties.

Also suitable herein are polynuclear phenolic antioxidants having the general formula III:

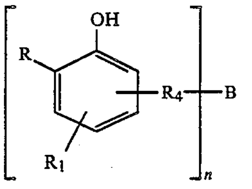

III wherein each R is independently selected from H, OH, $C_1$–$C_{18}$ alkyl and alkenyl, $C_5$–$C_8$ cycloalkyl, aryl, aralkyl, araloxyalkyl or arylthioalkyl each having up to 4 carbon atoms in the alkyl moiety, said cycloalkyl and aryl moieties being unsubstituted or substituted by one or more identical or different substituents selected from $C_1$–$C_4$ alkyl and alkoxy groups, each $R_1$ is selected from H and ortho- or para-substituted OH or $C_1$–$C_{18}$ alkyl; each $R_4$ is independently selected from ortho- and para-substituted $C_1$–$C_4$ alkylene, $C_1$–$C_4$ alkyleneoxy-($C_1$–$C_4$)-alkylene and $C_1$–$C_4$ alkylenethio-($C_1$–$C_4$)-alkylene moieties, said $C_1$–$C_4$ alkylene moieties optionally being substituted with one or more $C_1$–$C_4$ alkyleneoxycarbonyl or mono-or di-($C_1$–$C_4$) alkyleneoxy)phosphonyl moieties, or wherein $R_4$ represents a direct bond; n is from 2 to 4; and wherein B is a di:, tri- or tetravalent bridging moiety, preferably selected from thio, carboxy, phosphonoxy, isocyanurate, borate, sulphonyl and di-, tri- and tetravalent organic radicals. Suitable organic radicals can have a single bridging carbon or a chain having up to 6 carbons in a linear bridge. In both instances, however, any non-bridging carbon valences are preferably satisfied by H or by one or more alkyl moieties having a total of up to 12 carbon atoms.

The bridging moiety B is thus an n-valent group interconnecting the n phenolic moieties of the polynuclear antioxidant. Where doubt arises as to the differentiation of the B and $R^4$ moieties, the bridging moiety is taken to be the smallest possible n-valent group.

In the compounds of formula III, R is preferably selected from methyl, ethyl, isopropyl, sec-butyl, t-butyl, t-amyl, 1,1,3,3-tetramethylbutyl, $\alpha,\alpha$-dimethylbenzyl, cyclohexyl and 1-methylcyclohexyl, $R_1$ is preferably selected from methyl, ethyl, isopropyl, sec-butyl and t-butyl; $R_4$ is preferably selected from $C_1$–$C_4$ alkylene optionally substituted with $C_1$–$C_4$ alkyleneoxycarbonyl, and B is preferably selected from thio, methylene optionally substituted with one linear or branched $C_1$–$C_{12}$ alkyl moiety, tri- or tetravalent $C_3$–$C_6$ hydrocarbon, and tetravalent carbon. In highly preferred embodiments, R and $R_1$ both represent t-alkyl moieties branched on the alpha carbon, especially t-butyl moieties.

Another group of antioxidants which are especially useful herein are the oligomeric antioxidants having the general formula IV:

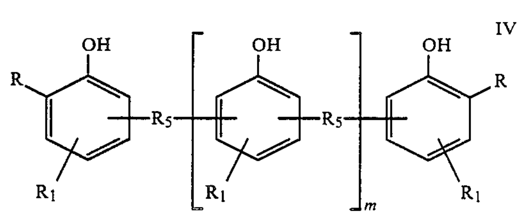

IV wherein each R is independently selected from H, OH, $C_1$–$C_{18}$ alkyl and alkenyl, $C_5$–$C_8$ cycloalkyl, aryl, aralkyl, araloxyalkyl or arylthioalkyl each having up to 4 carbon atoms in the alkyl moiety, said cycloalkyl and aryl moieties being unsubstituted or substituted by one or more identical or different substituents selected from $C_1$–$C_4$ alkyl and alkoxy groups; each $R_1$ is independently selected from ortho- or para-substituted OH or $C_1$–$C_{18}$ alkyl; $R_5$ is selected from $C_2$–$C_{10}$ alkylene and cycloalkylene moieties; and m is a number average from 1 to 10.

A particularly preferred antioxidant of this kind has the general formula IV above in which R is t-butyl, $R_1$ is 4-methyl, $R_5$ is dicyclopentadiendiyl and m averages from 1 to 3.

Phenolic ester antioxidants are also particularly suitable for use herein. Of this class, a preferred antioxidant is a complete or partial ester of a boron acid selected from orthoboric acid ($H_3BO_3$), metaboric acid ($HBO_3$) pyroboric acid ($H_4B_2O_5$), boronic acid ($H_3BO_2$) and borinic acid ($H_3BO$), wherein at least one esterifying group is a phenol having the general formula II or III. Particularly preferred antioxidants of this class are those wherein at least one esterifying group is a phenol having the general formula II wherein R and $R_1$ are selected from $C_4$–$C_{10}$ tertiary alkyl moieties branched on the alpha carbon and $R_2$ is selected from H and $C_1$–$C_4$ alkyl moieties. The boron esters can be completely arylated or can be mixed esters containing both phenol ester units and mono- or di-aliphatic alcohol or glycol ester units especially those derived from $C_1$–$C_{12}$ alkanol or $C_2$–$C_{12}$ alkylene glycol esterifying units. Partial orthoborate esters wherein boron is linked to a phenoxy radical and linked by the other two bonds to hydroxyl groups are also suitable herein. Methods of preparing these general classes of material are given in U.S. Pat. No. 3,356,707 and U.S. Pat. No. 3,359,298.

Particularly preferred antioxidants herein are selected from 4-methyl-2,6,-di-t-butylphenyl, 2,2'-methylenebis(4-methyl-6-t-butylphenol), 4,4'-methylenebis(2-6-di-t-butylphenol), 2,2'-methylenebis(4-methyl-6-(1-methylcyclohexyl)phenol), 4,4'-thiobis(6-t-butyl-3-methyl phenol), 4,4'-butylidene-bis(6-t-butyl-3-methylphenol), 6-t-butylhydroquinone, pyrogallol, 2,2'-methylene-bis(4-methyl-6-nonylphenol), 2,2'-iso-nonylene-bis(2,4-dimethylphenol), octadecyl 3-(3,5-di-t-butyl-4-hydroxyphenyl)propionate, tetrakis[methylene-3-(3',5'-di-t-butyl-4'-hydroxyphenyl propionate)methane, the compounds of formula II wherein R and $R_1$ are t-butyl and $R_2$ is selected from $CH_2SCH_2CO_2H$, $CH_2CH_2CO_2H$ and the $C_{18}$ alkyl esters thereof, tris-(2-methyl-4-hydroxy-5-t-butylphenyl) butane, the compound of formula IV in which R is t-butyl, $R_1$ is 4-methyl, $R_5$ is dicyclopentadiendiyl, and m averages about 1,2,4-bis(n-octylthio)-6-(4-hydroxy-3,5-di-t-butylanilino)-1,3,5-triazine, 2-(2'-hydroxy-3'-butyl-5'-methylphenyl)-5-chlorobenzotriazole, tri(4-methyl-2,6-di-t-butylphenyl)- metaborate, tri(4-methyl-2,6-di-t-butylphenyl)orthoborate, 2,6-di-t-butylphenyl-di-iso-propylorthoborate, 4-methyl-2,6-t-dibutylphenyl-di-isopropylorthoborate, di(4-methyl-2,6-di-t-butylphenyl)-n-butylorthoborate, di-(2,6-t-butylphenyl)-n-butylorthoborate and 4-methyl-2,6-di-t-butylphenyl-di-n-butylorthoborate.

Hindered-amine stabilizers suitable herein are disclosed in BE-A-734436, GB-A-1,390,251, GB-A-1,390,252 and GB-A-1,433,285 and preferably have the general formula V.

V

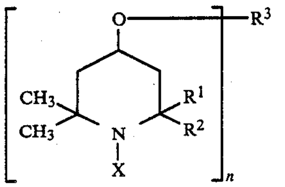

wherein $R^1$ and $R^2$ independently represent $C_1$–$C_4$ alkyl, preferably $CH_3$, N is from 1 to 4, preferably 2, X is H, $C_{1-4}$ alkyl, preferably H, and $R^3$ is an acyl or polyacyl moiety having n acyl groups and which is derived from an alphatic or aromatic carboxylic or polycarboxylic acid. Stabilizers in which X represents O or OH, and ammonium salts of V are also suitable, however. Particularly preferred stabilizers of the hindered-amine type include bis-(2,2,6,6-tetramethyl-4-piperidyl)sebacate available commercially under the trade name Tinuvin 770, and bis-(1,2,2,6,6-pentamethyl-4-piperidyl)sebacate available commercially under the trade name Tinuvin 292.

The bleach activator compound of the present compositions can be generally defined as a hydrophobic peroxyacid bleach precursor. Preferably the bleach precursor has the general formula I $$Ac-L \qquad I$$

wherein Ac is the acyl moiety of an organic carboxylic acid comprising an optionally substituted, linear or branched $C_6$–$C_{20}$ alkyl or alkenyl moiety or a $C_6$–$C_{20}$ alkyl-substituted aryl moiety and L is a leaving group, the conjugate acid of which has a pKa in the range from 4 to 13.

One highly preferred group of bleach activators herein have the general formula I wherein Ac is $R_5$-CO and $R_5$ is a linear or branched alkyl group containing from 6 to 20, preferably 6 to 12, more preferably 7 to 9 carbon atoms and wherein the longest linear alkyl chain extending from and including the carbonyl carbon contains from 5 to 18, preferably 5 to 10 carbon atoms, $R_5$ optionally being substituted (preferably alpha to the carbonyl moiety) by Cl, Br, $OCH_3$ or $OC_2H_5$.

In the above formula I, leaving group L has a pKa (conjugate acid) in the range from about 4 to about 13, preferably from about 8 to about 10. Examples of leaving groups are those having the formula (a)

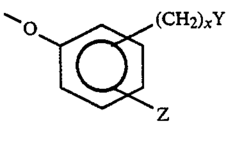

-continued (b)

and 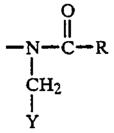

wherein Z is H, $R^1$ or halogen, $R^1$ is an alkyl group having from 1 to 4 carbon atoms, x is 0 or an integer of from 1 to 4 and Y is selected from $SO_3M$, $OSO_3M$, $CO_2M$, $N^+(R^1)_3Q^-$ and $N^+(R^1)_2-O^-$ wherein M is H, alkali metal, alkaline earth metal, ammonium or substituted ammonium, and Q is halide or methosulfate.

The preferred leaving group L has the formula (a) in which Z is H, x is 0 and Y is sulfonate, carboxylate or dimethylamine oxide radical.

Highly preferred materials are sodium 3,5,5,-trimethylhexanoyloxybenzene sulfonate, sodium 3,5,5-trimethylhexanoyloxybenzoate, sodium 2-ethylhexanoyl oxybenzenesulfonate, sodium nonanoyl oxybenzene sulfonate and sodium octanoyl oxybenzenesulfonate, the acyloxy group in each instance preferably being p-substituted.

A second highly preferred group of bleach activators herein have the general formula I wherein Ac has the formula $R_5(AO)_mXA$ wherein $R_5$ is a linear or branched alkyl or alkylaryl group containing from 6 to 20, preferably from 6 to 15 carbon atoms in the alkyl moiety, $R_5$ being optionally substituted by Cl, Br, $OCH_3$ or $OC_2H_5$, AO is oxyethylene or oxypropylene, m is from 0 to 100, X is O, $NR_1$ or CO—$NR_1$, and A is CO, CO—CO, $R_6$—CO, CO—$R_6$—CO or CO—$NR_1$—$R_6$—CO wherein $R_1$ is $C_1$–$C_4$ alkyl and $R_6$ is alkylene, alkenylene, arylene or alkarylene containing from 1 to 8 carbon atom in the alkylene or alkenylene moiety.

Bleach activator compounds of this type include carbonic acid derivatives of the formula $R_5(AO)_mOCOL$, succinic acid derivatives of the formula $R_5OCO(CH_2)_2COL$, glycollic acid derivatives of the formula $R_5OCH_2COL$, hydroxypropionic acid derivatives of the formula $R_5OCH_2CH_2COL$, oxalic acid derivatives of the formula $R_5OCOCOL$, maleic and fumaric acid derivatives of the formula $R_5OCOCH{=}CHCOL$, acyl aminocaproic acid derivatives of the formula $R_5CONR_1(CH_2)_6COL$, acyl glycine derivativs of the formula $R_5CONR_1CH_2COL$, and amino-6-oxocaproic acid derivatives of the formula $R_5N(R_1)CO(CH_2)_4COL$. In the above, m is preferably from 0 to 10, and $R_5$ is preferably $C_6$–$C_{12}$, more preferably $C_6$–$C_{10}$ alkyl when m is zero and $C_9$–$C_{15}$ alkyl when m is non-zero. The leaving group L is as defined above.

The bleach activator composition herein will normally be in the form of particles comprising the bleach activator and antioxidant, optionally together with a binder or agglomerating agent, the latter when present in an amount of from about 0.5% to 50%, preferably about 1% to 20% by weight of the activator composition. In addition, the particles can additionally contain a solid diluent. The agglomerating agent can take the form of a carrier in which the bleach activator, and if present, diluent are dispersed, or the agglomerating agent can simply act to promote physical adhesion of the components of the bleach activator composition. Alternatively the agglomerating agent can function as an encapsulating or coating agent for the bleach activator. Preferred agglomerating agents and diluents are described in EP-A-0099197 and EP-A-0106634.

Suitable organic carriers are selected from polyethylene glycols of molecular weight greater than about 1000, $C_{12}$–$C_{24}$ fatty acids and esters and amides thereof, polyvinylpyrrolidones, especially those having a molecular weight (viscosity average) in the range from about 1500 to about 1,500,000, more especially from about 3000 to about 700,000, and $C_{14}$–$C_{24}$ fatty alcohols ethoxylated with from about 14 to about 100 moles of ethylene oxide. Suitable inorganic carriers include the amorphous phosphate glasses described in EP-A-0057088. Preferred diluents are inorganic and include alkali metal, alkaline earth metal and ammonium sulphates and chlorides, neutral and acid alkali metal carbonates, orthophosphates and pyrophosphates, and alkali metal crystalline polyphosphates. Suitable water-insoluble but dispersible diluents include the finely-divided natural and synthetic silicas and silicates, especially smectite-type and kaolinite-type clays such as sodium and calcium montmorillonite, kaolinite itself, aluminosilicates, and magnesium silicates and fibrous and microcrystalline celluloses. Suitable adhesive materials include the organic carrier materials described above, water, aqueous solutions or dispersions of the inorganic diluent materials described above, anionic surfactants, film-forming polymers and solutions and latexes thereof, for example, sodium caboxymethylcellulose, methylceullulose, poly(oxyethylene), polyvinylacetate, polyvinylalcohol, dextrins, ethylene vinylacetate copolymers and acrylic latexes. Other suitable polymers include the homopolymers and copolymers of acrylic acid, hydroxyacrylic acid, or methacrylic acid, which in the case of the copolymers contain at least 50%, and preferably at least 80%, by weight of units derived from the acid. The particularly preferred polymer is sodium polyacrylate. Other specific preferred polymers are the homopolymers and copolymers of maleic anhydride, especially the copolymers with ethylene, styrene and vinyl methyl ether. These polymers are commercially available under the trade names Versicol and Gantrez. Other suitable polymers incude the cellulose sulfate esters such as cellulose acetate sulfate, cellulose sulfate, hydroxyethyl cellulose sulfate, methyl cellulose sulfate and hydroxypropyl cellulose sulfate.

In some instances, the antioxidant defined herein also serves in a binding or agglomerating functionality and can be used to partially or totally replace other binding materials as listed above. Moreover antioxidants which are themselves storage-sensitive may also require special measures to protect the antioxidant by incorporation either alone or in combination with the bleach activator in a binder or agglomerating agent. For example, certain antioxidants such as 4-methyl-2,6-di-t-butylphenol have a relatively high vapor pressure and should be incorporated within a relatively impervious carrier material such as an amorphous phosphate glass or an organic carrier as described above.

In a highly preferred embodiment, the antioxidant is incorporated in a polyvinylpyrrolidone organic carrier, the weight ratio of antioxidant to polyvinylpyrrolidone lying preferably in the range from about 3:1 to about 1:6, more preferably from about 2:1 to about 1:3. Preferred from the viewpoint of storage stability and detergency performance are polyvinylpyrrolidones having a molecular weight of from about 3000 to about 55,000, more preferably, from about 8000 to about 40,000, molecular weights being measured as a viscosity average (see V. Bühler and U. Klodwig, Acta Pharmaceutica Technologica 30(4), 1984, 317-323, Equation 10). The antioxidant can be incorporated in the polyvinylpyrrolidone by dissolving the components in a mutual solvent such as ethanol, followed by solvent evaporation, or by preparing a comelt of the individual components followed by cooling to yield a solid, amorphous glass-like material, or by fusing the individual ingredients together at elevated temperature. Thereafter, the material is comminuted to a weight-average particle size of from about 2 mm to about 0.05 mm, preferably from about 1 mm to about 0.2 mm. The comminuted material is thereafter mixed with a diluent as described above, the preferred diluent being a water-soluble inorganic diluent, for example, an alkali metal sulfate, and the mixture is then coated or agglomerated with an organic coating or agglomerating material such as a $C_{12}$–$C_{24}$ fatty acid ester or amide, a paraffinic or microcrystalline wax or, in highly preferred embodiments, a polyethyleneglycol having a molecular weight of from about 1500 to about 8000. The final agglomerate normally comprises from about 20% to 94% of the antioxidant/polyvinylpyrrolidone mixture, from about 5% to about 60% of the diluent and from about 1% to about 20% of the coating or agglomerating material. Alternatively the antioxidant-/polyvinylpyrrolidone mixture can be comminuted to a particle size of from about 0.05 to about 0.20 mm and thereafter incorporated in or coated on the bleach activator agglomerate using, for example, polyethyleneglycol as an agglomerating or adhesive agent.

The bleach activator composition can be prepared by extrusion, for example through a radial extruder as described in EP-A-0062523, by agglomeration in a pan agglomerator, Schugi mixer or fluidized bed, as described for example in EP-A-0106634, or by spray drying as described for example in EP-A-0174132.

The present invention also encompasses bleaching compositions, detergent and laundry additive compositions comprising the bleach activator compositions detailed herein. Bleaching compositions according to the invention suitably contain from about 5% to about 99.5%, preferably from about 20% to about 90% of peroxygen bleaching agent (i.e. a source of alkaline hydrogen peroxide) and from about 0.5% to about 95%, preferably from about 10% to about 80% of bleach activator composition. In highly preferred bleaching compositions, the molar ratio of alkaline hydrogen peroxide:bleach activator is at least 1.5:1. Detergent compositions according to the invention generally contain from about 1% to about 75%, preferably from about 5% to about 40%, more preferably from about 8% to about 25% of organic surfactant selected from anionic, nonionic, cationic, ampholytic and zwitterionic surfactants and mixtures thereof, from about 0.5% to 40%, preferably from about 5% to about 20% of peroxygen bleaching agent and from about 0.1% to about 20%, preferably from about 0.5% to about 10% of the bleach activator composition defined herein. The level of antioxidant in the total detergent composition preferably comprises from about 0.01% to about 10%, more preferably from about 0.05% to about 2%, especially from about 0.1% to about 1%. The level of peroxyacid bleach precursor in the total composition preferably comprises from about 0.1% to about 15%, more preferably from about 0.25% to about 5% by weight of total composition.

The detergent compositions of the invention can take the form of a conventional main wash laundry detergent composition or of a laundry additive composition for use together with a separate main-wash detergent composition. In either instance, however, preferred compositions will normally contain from about 1% to about 75% surfactant.

The compositions can also be complemented by other usual laundry detergent components such as detergency builders, etc.

Suitable synthetic anionic surfactants are water-soluble salts of $C_8$–$C_{22}$ alkyl benzene sulphonates, $C_8$–$C_{22}$ alkyl sulphates, $C_{10-18}$ alkyl polyethoxy ether sulphates, $C_{8-24}$ paraffins sulphonates, alpha-$C_{12-24}$ olefin sulphonates, alpha-sulphonated $C_6$–$C_{20}$ fatty acids and their esters, $C_{10}$–$C_{18}$ alkyl glyceryl ether sulphonates, fatty acid monoglyceride sulphates and sulphonates, espcially those prepared from coconut oil, $C_8$–$C_{12}$ alkyl phenol polyethoxy ether sulphates, 2-acyloxy $C_9$–$C_{23}$ alkane-1-sulphonate, and beta-alkyloxy $C_8$–$C_{20}$ alkane sulphonates.

A particularly suitable class of anionic surfactants includes water-soluble salts, particularly the alkali metal, ammonium and alkanolammonium salts or organic sulphuric reaction products having in their molecular structure as alkyl or alkaryl group containing from about 8 to about 22, especially from about 10 to about 20 carbon atoms and a sulphonic acid or sulphuric acid ester group. (Included in the term "alkyl" is the alkyl portion of acyl groups).

Examples of this group of synthetic detergents are the sodium and potassium alkyl sulphates, especially those obtained by sulphating the higher alcohols ($C_{8-18}$) carbon atoms produced by reducing the glycerides of tallow or cocount oil and sodium and potassium alkyl benzene sulphonates, in which the alkyl group contains from about 9 to about 15, especially about 11 to about 13, carbon atoms, in straight chain or branched chain configuration, e.g. those of the type described in U.S. Pat. No. 2,220,099 and U.S. Pat. No. 2,477,383 and those prepared from alkylbenzenes obtained by alkylation with straight chain chloroparaffins (using aluminium trichloride catalysis) or straight chain olefins (using hydrogen fluoride catalysis). Especially valuable are linear straight chain alkyl benzene sulphonates in which the average of the alkyl group is about 11.8 carbon atoms, abbreviated as $C_{11.8}$ LAS, and $C_{12}$–$C_{15}$ methyl branched alkyl sulphates.

The alkane chains of the foregoing non-soap anionic surfactants can be derived from natural sources such as coconut oil or tallow, or can be made synthetically as for example using the Ziegler or Oxo processes. Water solubility can be achieved by using alkali metal, ammonium or alkanolammonium cations; sodium is preferred.

Suitable fatty acid soaps herein can be selected from the ordinary alkali metal (sodium, potassium), ammonium, and alkylolammonium salts of higher fatty acids containing from about 8 to about 24, preferably from about 10 to about 22 and especially from about 16 to about 22 carbon atoms in the alkyl chain. Fatty acids in partially neutralized form are also suitable for use herein, especially in liquid compositions. Sodium and potassium soaps can be made by direct saponification of the fats and oils or by the neutralization of the free fatty acids which are prepared in a separate manufacturing process. Particularly useful are the sodium and potassium salts of the mixtures of fatty acids derived from tallow and hydrogenated fish oil.

Mixtures of anionic surfactants are particularly suitable herein, especially mixtures of sulphonate and sulphate surfactants in a weight ratio of from about 5:1 to about 1:5, preferably from about 5:1 to about 1:1, more preferably from about 5:1 to about 1.5:1. especially preferred is a mixture of an alkyl benzene sulphonate having from 9 to 15, especially 11 to 13 carbon atoms in the alkyl radical, the cation being an alkali metal, preferably sodium; and either an alkyl sulphate having from 10 to 20, preferably 12 to 18 carbon atoms in the alkyl radical or an ethoxy sulphate having from 10 to 20, preferably 10 to 16 carbon atoms in the alkyl radical and an average degree of ethoxylation of 1 to 6, having an alkali metal cation, preferably sodium.

Nonionic surfactants suitable herein are condensates of ethylene oxide with a hydrophobic moiety to provide a surfactant having an average hydrophilic-lipophilic balance (HLB) in the range from about 8 to 17, preferably from about 9.5 to 13.5, more preferably from about 10 to about 12.5.

Examples of suitable nonionic surfactants include the condensation products of primary or secondary aliphatic alcohols having from 8 to 24 carbon atoms, in either straight chain or branched chain configuration, with from 2 to about 40 moles, preferably 2 to about 9 moles of ethylene oxide per mole of alcohol. Preferably, the aliphatic alcohol comprises between 9 and 18 carbon atoms and is ethoxylated with between 2 and 9, desirably between 3 and 8 moles of ethylene oxide per mole of aliphatic alcohol. The preferred surfactants are prepared from primary alcohols which are either linear (such as those derived from natural fats or, prepared by the Ziegler process from ethylene, e.g. myristyl, cetyl, stearyl alcohols, or partly branched such as the Lutensols, Dobanols and Neodols which have about 25% 2-methyl branching (Lutensol being a Trade Name of BASF, Dobanol and Neodol being Trade Names of Shell), or Synperonics, which are understood to have about 50% 2-methyl branching (Synperonic is a Trade Name of I.C.I.) or the primary alcohols having more than 50% branched chain structure sold under the Trade Name Lial by Liquichimica. Specific examples of nonionic surfactants falling within the scope of the invention include Dobanol 45-4, Dobanol 45-7, Dobanol 45-9, Dobanol 91-2.5, Dobanol 91-3, Dobanol 91-4, Dobanol 91-6, Dobanol 91-8, Dobanol 23-6.5, Synperonic 6, Synperonic 14, the condensation products of coconut alcohol with an average of between 5 and 12 moles of ethylene oxide per mole of alcohol, the coconut alkyl portion having from 10 to 14 carbon atoms, and the condensation products of tallow alcohol with an average of between 7 and 12 moles of ethylene oxide per mole of alcohol, the tallow portion comprising essentially between 16 and 22 carbon atoms. Secondary linear alkyl ethoxylates are also suitable in the present compositions, especially those ethoxylates of the Tergitol series having from about 9 to 15 carbon atoms in the alkyl group and up to about 11, especially from about 3 to 9, ethoxy residues per molecule.

Other suitable nonionic surfactants include the condensation products of $C_6$–$C_{12}$ alkyl phenols with from about 3 to 30, preferably 5 to 14 moles of ethylene oxide, and the compounds formed by condensing ethylene oxide with a hydrophobic base formed by the condensation of propylene oxide with propylene glycol, such synthetic nonionic detergents being available on the market under the Trade Name of "Pluronic" supplied by Wyandotte Chemicals Corporation.

Especially preferred nonionic surfactants for use herein are the $C_9$–$C_{15}$ primary alcohol ethoxylates containing 3–8 moles of ethylene oxide per mole of alcohol, particularly the $C_{12}$–$C_{15}$ primary alcohols containing 6–8 moles of ethylene oxide per mole of alcohol.

The compositions of the invention can also contain from about 0.1% to about 20%, more preferably from about 0.5% to about 15%, especially from about 1% to about 5% of a water-soluble quaternary ammonium surfactant. Preferred for use herein are quaternary ammonium surfactants having the general formula:

$$[R^2(OR^3)_y][R^4(OR^3)_y]_2R^5N^+X^-$$

wherein $R^2$ is an alkyl, alkenyl or alkyl benzyl group having from about 8 to about 18 carbon atoms, preferably 10 to 14 carbon atoms in the alkyl chain; each $R^3$ is selected from $-CH_2CH_2-$, $-CH_2CH(CH_3)-$, $-CH_2CH(CH_2OH)-$, $-CH_2CH_2CH_2-$, and mixtures thereof; each $R^4$ is selected from $C_1$–$C_4$ alkyl, $C_1$–$C_4$ hydroxyalkyl, benzyl, ring structures formed by joining the two $R^4$ groups, $-CH_2CHOHCHOHCOR^6CHOHCH_2OH$ wherein $R^6$ is any hexose or hexose polymer having a molecular weight less than about 1,000, and hydrogen when y is not 0; $R^5$ is the same as $R^4$ or is an alkyl chain wherein the total number of carbon atoms of $R^2$ plus $R^5$ is not more than about 18; each y is from 0 to about 10 and the sum of the y values is from 0 to about 15; and X is any compatible anion.

Preferred of the above are the alkyl quaternary ammonium surfactants, especially the mono-long chain alkyl susrfactants described in the above formula when $R^5$ is selected from the same groups as $R^4$. The most preferred quaternary ammonium surfactants are the chloride, bromide and methylsulfate alkyl trimethylammonium salts, alkyl di(hydroxyethyl)methylammonium salts, alkyl hydroxyethyldimethylammonium salts, and alkyloxypropyl trimethylammonium salts wherein alkyl is $C_8$–$C_{16}$, preferably $C_{10}$–$C_{14}$. Of the above, decyl trimethylammonium methylsulfate, lauryl trimethylammonium chloride, myristyl trimethylammonium bromide and coconut trimethylammonium chloride and methylsulfate are particularly preferred.

Other useful cationic surfactants are disclosed in U.S. Pat. No. 4,259,217.

Highly preferred water-soluble cationic surfactants herein have a critical micelle concentration (CMC) as measured for instance by surface tension or conductivity of at least 200 ppm, preferably at least 500 ppm at 30° C. and in distilled water—see for instance Critical Micelle Concentrations of Aqueous Surfactant Systems, P. Mukerjee and K J Mysels NSRDS-NBS 36, (1971).

Suitable builder salts useful in the compositions of the invention can be of the polyvalent inorganic and polyvalent organic types, or mixtures thereof. The level of these materials is generally from about 15% to about 90%, preferably from about 20% to about 60% by weight of the total laundry composition. Non-limiting examples of suitable water-soluble, inorganic alkaline builder salts include the alkali metal carbonates, borates, phosphates, pyrophosphates, tripolyphosphates and bicarbonates.

Organic builder/chelating agents that can be incorporated include organic polycarboyxlates and aminopolycarboyxlates and their salts, organic phosphonate derivatives such as those disclosed in U.S. Pat. Nos. 3,213,030, 3,433,021, 3,292,121 and 2,599,807, and carboxylic acid builder salts such as those disclosed in U.S. Pat. No. 3,308,067. Particularly useful carboxylates for use in liquid detergents are the $C_{10}$–$C_{20}$, preferably $C_{12}$–$C_{16}$ alkyl or alkenyl succinates such as lauryl, myristyl, palmityl, 2-dodecenyl and 2-pentadecenyl succinate.

Preferred chelating agents include citric acid, nitrilotriacetic (NTA) and ethylenediamine tetra acetic acids (EDTA), hydroxyethylethylenediaminetriacetic acid (HEEDTA), nitrilo(trimethylene phosphonic acid) (NTMP), ethylenediamine tetra(methylene phosphonic acid) (EDTMP) and diethylenetriamine penta(methylene phosphonic acid) (DETPMP) and salts thereof. Mixtures of organic and/or inorganic builders can be used herein. One such mixture of builders is disclosed in CA-A-755,038, e.g. a ternary mixture of sodium tripolyphosphate, trisodium nitrilotriacetate, and trisodium ethane-1-hydroxy-1,1-diphosphonate.

Suitably, detergent compositions herein can have a low or zero phosphate content, corresponding to a phosphorus content of less than about 5%, preferably less than about 2% by weight. In compositions of this type, the builder preferably belongs to the alumino silicate type which functions by cation exchange to ..emove polyvalent mineral hardness and heavy metal ions from solution. A preferred builder of this type has the formulation $Na_z(AlO_2)_z(SiO_2)_y.xH_2O$ wherein z and y are integers of at least 6, the molar ratio of z to y is in the range from 1.0 to about 0.5 and x is an integer from about 15 to about 264. Compositions incorporating builder salts of this type form the subject of GB-A-1,429,143, DE-A-2,433,485, and DE-A-2,525,778.

The detergent compositions herein can be supplemented by all manner of detergent and laundering components.

An alkali metal, or alkaline earth metal, silicate can also be present. The alkali metal silicate is preferably from about 3% to about 15% by weight of the total composition. Suitable silicate solids have a molar ratio of $SiO_2$/alkali metal$_2$O in the range from about 0.5 to about 3.3, more preferably from about 1.0 to about 2.0.

The detergent compositions herein, especially those designed for main wash use, will generally also contain bleaching components. In general, suitable bleaches are inorganic peroxygen bleaches selected from inorganic peroxy salts, hydrogen peroxide and hydrogen peroxide adducts. The compositions herein, however, can also be supplemented by organic peroxy acids and salts thereof. Suitable inorganic peroxygen bleaches include sodium perborate mono- and tetrahydrate, sodium percarbonate, sodium persilicate, urea-hydrogen peroxide addition products and the clathrate $4Na_2SO_4{:}2H_2O_2{:}1NaCl$. Suitable organic bleaches include peroxylauric acid, peroxyoctanoic acid, peroxynonanoic acid, peroxydecanoic acid, diperoxydodecanedioic acid, diperoxyazelaic acid, mono- and diperoxyphthalic acid and mono- and diperoxyisophthalic acid and salts (especially the magnesium salts) thereof. The bleaching agent is generally present at a level of from about 0.5% to about 40%, preferably from about 5% to about 20% by weight of total detergent composition. The detergent compositions herein can also be supplemented by peroxyacid bleach precursors other than the hydrophobic bleach activators described above, for example peracetic acid bleach precursors such as tetraacetylethylene diamine, tetraacetylmethylenediamine, tetraacetylhexylenediamine, sodium p-acetoxybenzene sulphonate, tetraacetylglycouril, pentaacetylglucose, octaacetyllactose and methyl O-actoxy benzoate. The level of such additional bleach precursor can lie in the range from about 0.5% to about 10%, preferably from about 1% to about 6% by weight of the total composition.

Other optional components of the compositions herein include suds suppressors, enzymes, fluorescers, photoactivators, soil suspending agents, anti-caking agents, pigments, perfumes, fabric conditions agents etc.

Suds suppressors are represented by materials of the silicone, wax, vegetable and hydrocarbon oil and phosphate ester varieties. Suitable silicone suds controlling agents include polydimethylsiloxanes having a molecular weight in the range from about 200 to about 200,000 and a kinematic viscosity in the range from about 20 to about 2,000,000 $mm^2/s$, preferably from about 3000 to about 30,000 $mm^2/s$, and mixtures of siloxanes and hydrophobic silanated (preferably trimethylsilanated) silica having a particle size in the range from about 10 millimicrons to about 20 millimicrons and a specific surface area above about 50 $m^2/g$. Suitable waxes include microcrystalline waxes having a melting point in the range from about 65° C. to about 100° C., a molecular weight in the range from about 4000–1000, and a penetration value of at least 6, measured at 77° C. by ASTM-D1321, and also paraffin waxes, synthetic waxes and natural waxes. Suitable phosphate esters include mono- and/or di-$C_{16}$–$C_{22}$ alkyl or alkenyl phosphate esters, and the corresponding mono- and/or di alkyl or akenyl ether phosphates containing up to 6 ethoxy groups per molecule.

Enzymes suitable for use herein include those discussed in U.S. Pat. No. 3,519,570 and U.S. Pat. No. 3,533,139. In liquid detergents, enzyme stabilizers such as propanediol, sodium formate, calcium and boric acid are also useful. Suitable fluorescers include Blankophor MBBH (Bayer AG) and Tinopal CBS-X and EMS (Ciba Geigy). Photoactivators are discussed in EP-A-57088, highly preferred materials being zinc phthalocyanine, tri- and tetra-sulfonates. Suitable fabric conditioning agents include smectite-type clays are disclosed in GB-A-1400898 and di-$C_{12}$–$C_{24}$ alkyl or alkenyl amines and ammonium salts.

Antiredeposition and soil suspension agents suitable herein include the ethoxylated amine, imine and ammonium compounds disclosed in EP-A-0,112,593, EP-A-0,111,965, EP-A-0,111,984, EP-A-0,111,976 and EP-A-0,112,592 as well as cellulose derivatives such as methylcellulose, carboxymethylcellulose and hydroxyethylcellulose, and homo- or co-polymeric polycarboxylic acids or their salts in which the polycarboxylic acid comprises at least two carboxyl radicals separated from each other by not more than two carbon atoms. Polymers of this type are disclosed in GB-A-1,596,756. Preferred polymers include copolymers or salts thereof of maleic anhydride with ethylene, methylvinyl ether, acrylic acid or methacrylic acid, the maleic anhydride constituting at least about 10 mole percent, preferably at least about 20 mole percent of the copolymer. These polymers are valuable for improving whiteness maintenance, fabric ash deposition, and cleaning performance on clay soils.

The laundry detergent and additive compositions of the invention can be formulated, packaged and retailed in conventional granular, powdery or liquid form or the composition can be formulated as part of a laundry product which comprises the composition in water-releasable combination with a water-insoluble substrate or a single- or multi-compartment sachet.

Laundry products preferred for use herein comprise a substrate or sachet formed from a flexible, water-insoluble sheet-like material. The sheet-like material may be made of paper, woven or non-woven fabrics or the like.

The basis weight of the water-insoluble sheet is preferably from about 10 to about 70 grams/se meter, more preferably from about 20 to about 50 grams/sq meter. Preferred materials for use herein are apertured nonwoven fabrics which can generally be defined as adhesively or thermo-bonded fibrous or filamentous products, having a web or carded fibre structure (where the fibre strength is suitable to allow carding) or comprising fibrous mats, in which the fibres of filaments are distributed haphazardly or in random array (i.e. an array of fibres in a carded web wherein partial orientation of the fibres is frequently present as well as a completely haphazard distributional orientation) or substantially aligned. The fibres or filaments can be natural (e.g. wool, silk, wood pulp, jute, hemp, cotton, linen, sisal, or ramie), synthetic (e.g. rayon, cellulose, ester, polyvinyl derivatives, polyolefins, polyamides, or polyesters) or mixtures of any of the above.

Generally, non-woven cloths can be made by air or water laying processes in which the fibres or filaments are first cut to desired lengths from long strands, passed into a water or air stream, and then deposited onto a screen through which the fibre-laden air or water is passed. The deposited fibres or filaments are then adhesively or thermo-bonded together, dried cured and otherwise treated as desired to form the non-woven cloth. Non-woven cloths which are spin-bonded, spin-laced or melt-blown are also suitable however.

Preferably, the non-woven cloth is made from cellulosic fibres, particularly from regenerated cellulose or rayon, which are lubricated with standard textile lubricant such as sodium oleate. The non-woven cloth preferably also has a content of a polyolefin such as polypropylene to allow for heat sealing to the poly(ethylene oxide) film. Preferably the fibres are from about 4 to about 50 mm, especially from about 8 mm to about 20 mm, in length and are from about 1 to about 5 denier (denier is an internationally recognised unit in yarn measure, corresponding to the weight in grams of a 9,000 meter length of yarn).

Preferably the fibres are at least partially orientated haphazardly, particularly substantially haphazardly, and are adhesively bonded together with hydrophobic or substantially hydrophobic binder-resin, particularly with a nonionic self-crosslinking acrylic polymer or polymers. In highly preferred embodiments, the cloth comprises from about 75% to about 88%, especially from about 78% to about 84% fibre and from about 12% to about 25%, especially from about 16% to about 22% hydrophobic binder-resin polymer by weight and has a basic weight of from about 10 to about 70, preferably from 20 to 50 $g/m^2$. Suitable hydrophobic binder-resins are ethylacrylate resins such as Primal HA24, Rhoplex HA8 and HA16 (Rohm and Haas, Inc) and mixtures thereof.

The substrate apertures, which extend between opposite surfaces of the substrate, are normally in a pattern and are formed during lay-down of the fibres to produce the substrate. Exemplary apertured non-woven substrates are disclosed in U.S. Pat. Nos. 3,741,724, 3,930,086 and 3,750,237.

An example of an apertured non-woven substrate suitable herein is a polypropylene-containing regenerated cellulose sheet of 1.5 denier fibres bonded with Rhoplex HA 8 binder (fibre:binder ratio of about 77:23) having a basis weight of about 35 $g/m^2$ and about 17 apertures/$cm^2$. The apertures are generally ellipitical in shape and are in side-by-side arrangement. The apertures have a width of about 0.9 mm and a length of about 2.5 mm measured in a relaxed condition. Another highly preferred substrate based on 1.5 denier regenerated cellulose fibres with Rhoplex HA8 binder has a fibre:binder ration of about 82:18, a basis weight of about 35 g/m$^2$, and about 22 apertures/cm$^2$. In this example, the apertures are generally square-shaped with a width of about 1.1 mm. The apertures are again disposed in side-by-side arrangement.

In the substrate embodiments of the invention, the laundry composition is coated on or impregnated into the substrate at a weight ratio of composition:substrate of at least about 3:1, preferably at least about 5:1. In these embodiments, the laundry composition preferably contains at least about 5%, more preferably at least about 15% by weight of composition of water-soluble or water-dispersible organic binding agent. Preferably, the binding agent is selected from polyethylene glycols of molecular weight greater than about 1,000, more preferably greater than about 4,000, $C_{12}$–$C_{18}$ fatty acids and esters and amides thereof, polyvinyl pyrrolidone of molecular weight in the range from about 40,000 to bout 700,000, and $C_{14}$–$C_{24}$ fatty alcohols ethoxylated with from about 14 to about 100 moles of ethylene oxide.

The laundry conpositions of the invention in granular or powder form are preferably made by spray-drying an aqueous slurry comprising anionic surfactant and detergency builder to a density of at least about 0.3 g/ccm, spraying-on nonionic surfactant, where present, optionally comminuting the spray-dried granules in for example a Patterson-Kelley twin shell blender to a bulk density of at least about 0.5 g/cc, and thereafter admixing the bleach activator composition in particulate form. The aqueous slurry for spray drying preferably comprises from about 30% to about 60% water and from about 40% to about 70% of the detergency builder; it is heated to a temperature of from about 60° C. to about 90° C. and spray dried in a current of air having an inlet temperature of from about 200° C. to about 400° C., preferably from about 275° C. to about 350° C., and an outlet temperature of from about 95° C. to about 125° C., preferably from about 100° C. to about 115° C. The weight average particle size of the spray dried granules is from about 0.15 to about 3 mm, preferably from about 0.5 mm to about 1.4 mm. After comminution, the weight average particle size is from about 0.1 to about 0.5 mm, preferably from about 0.15 to about 0.4 mm.

In the Examples, the abbreviations used have the following designation:

| | |
|---|---|
| LAS | Sodium linear $C_{12}$ alkyl benzene sulphonate |
| TAS | Sodium tallow alkyl sulphate |
| $C_{14/15}$AS | Sodium $C_{14}$–$C_{15}$ alkyl sulphate |
| $TAE_n$ | Hardened tallow alcohol ethoxylated with n moles of ethylene oxide per mole of alcohol |
| $C_{14}$TMAB | $C_{14}$ alkyl trimethyl ammonium bromide |
| Dobanol 45-E-7 | A $C_{14}$–$C_{15}$ primary alcohol condensed with 7 moles of ethylene oxide, marketed by Shell |
| INOBS | Sodium 3,5,5-trimethyl hexanoyl oxybenzene sulphonate |
| TAED | Tetraacetylethylenediamine |
| Silicone/Silica | 85:15 mixture of polydimethylsiloxane and silanated silica prilled with STPP and $TAE_{80}$ |
| Enzyme | Savinase prills |
| NTA | Sodium nitrilotriacetate |

-continued

| | |
|---|---|
| MTBP | 2,2'- methylene bis (4-methyl-6-t-butylphenol) |
| BHT | 4-methyl-2,6-di-t-butyl phenol |
| TBPM | tri(4-methyl-2,6-di-t-butylphenyl) metaborate |
| Tinuvin 770 | Bis-(2,2,6,6-tetramethyl-4-piperidyl) sebacate |
| CMC | Sodium carboxymethylcellulose |
| PVP | Polyvinylpyrrolidone - 40,000 molecular weight |
| STPP | Sodium tripolyphosphate |
| Zeolite | Zeolite 4A |
| Gantrez AN119 | Maleic anhydride/vinyl methyl ether copolymer mol. wt about 240,000 |
| Metasilicate | Sodium metasilicate |
| $Na_2CO_3$ | Sodium carbonate |
| Silicate | Sodium silicate ($SiO_2$:$Na_2O$ = 1.6:1) |
| MA/AA | Maleic acid/acrylic acid copolymer, 1:3 mole ratio, m. wt. 70,000 |
| EDTA | Sodium ethylenediaminetetraacetate |
| Brightener | Tinopal (RTM) CBS-X |
| EDTMP | Ethylenediamine tetra(methylene phosphonic acid), marketed by Monsanto, under the Trade name Dequest 2041 |
| DETPMP | Diethylenetriamine penta(methylenephosphonic acid) |

EXAMPLES I TO VIII

Granular detergent compositions are prepared as follows. A detergent base powder composition is first prepared by mixing the indicated components in a crutcher as an aqueous slurry at a temperature of about 55° C. and containing about 35% water. The slurry is then spray dried at a gas inlet temperature of about 330° C. to form base powder granules and the granules are comminuted in a Patterson-Kelley twin shell blender. A separate bleach activator composition is then prepared by mixing the indicated components and extruding throough a Simen-Heesen extruder (Examples I to V, VII and VIII) or by coating them in a falling curtain of $C_{14/16}$ fatty acids (Example VI). Where the antioxidant is added as a separate prill (Examples V and VII), this is prepared either by spraying a 50% aqueous mixture of amorphous phosphate of formula $(Na_2O)_x(P_2O_5)_y$ wherein y is about 3 and x:y is about 1.0, onto a mixture of BHT antioxidant (60 parts) and anhydrous granular pentasodium tripolyphosphate (5 parts) in a rotating drum, the level of phosphate in the final prill being 35 parts (Example V); or by preparing a melt of BHT antioxidant at about 120° C., adding PVP thereto at a weight ratio (PVP:BHT) of about 60:40, cooling to room temperature, comminuting to a weight average particle size of about 0.75 mm, and coating the comminuted particles with polyethyleneglycol 3000 at a coating weight of about 5% (Example VII). Finally, the detergent base powder composition is dry mixed with enzyme, silicate, carbonate, bleach, and bleach activator and antioxidant prill and additional nonionic surfactant, where present, is sprayed onto the total mixture.

All percentages are given by weight of total detergent composition.

| | EXAMPLES | | | | | | | |
|---|---|---|---|---|---|---|---|---|
| | I | II | III | IV | V | VI | VII | VIII |
| Detergent Base | | | | | | | | |

-continued

| | EXAMPLES | | | | | | | |
|---|---|---|---|---|---|---|---|---|
| | I | II | III | IV | V | VI | VII | VIII |
| Powder | | | | | | | | |
| LAS | 6 | 5 | 8 | 5 | 8 | 5 | 6 | 7 |
| $C_{14/15}AS$ | — | — | 3 | — | — | 5 | — | — |
| TAS | 4 | 5 | — | 5 | 1 | 5 | 3 | 2 |
| $C_{14}TMAB$ | — | — | 2 | — | 1 | — | — | — |
| Gantrez AN119 | — | — | — | — | 1 | — | 1 | — |
| Silicate | — | — | — | 5 | 1 | 3 | 5 | 7 |
| MA/AA | 2 | 2 | 1 | 2 | — | 3 | 1 | 4 |
| Zeolite A | — | 18 | 12 | 18 | — | — | — | 22 |
| Brightener | 0.2 | 0.3 | 0.1 | 0.2 | 0.2 | 0.3 | 0.2 | 0.2 |
| NTA | — | 3 | — | — | — | — | — | — |
| Dequest 2060 | 0.1 | — | — | — | — | — | 0.2 | — |
| Dequest 2041 | — | 0.3 | 0.2 | 0.3 | 0.1 | — | — | 0.1 |
| EDTA | 0.2 | 0.3 | — | 0.2 | 0.2 | 0.2 | 0.2 | 0.2 |
| Sodium tripolyphosphate | 22 | 24 | 6 | 4 | 30 | 22 | 22 | — |
| Magnesium sulphate (ppm) | 1000 | 1000 | 800 | 1000 | 1200 | — | 1000 | 1000 |
| Sodium sulphate, moisture & miscellaneous | to 100 | | | | | | | |
| Bleach Activator Composition | | | | | | | | |
| INOBS | 2 | 3 | 1 | 4 | 2 | 2 | 2 | 3 |
| TAED | 0.3 | — | 3 | — | 0.4 | 0.3 | 0.5 | — |
| Disodium dihydrogen pyrophosphate | 0.3 | 0.3 | — | 0.4 | 0.3 | — | 0.3 | 0.3 |
| Sodium sulphate | — | — | — | 0.5 | 1 | — | — | — |
| Dequest 2041 | — | — | 0.5 | — | — | — | — | — |
| $TAE_{25}$ | 0.3 | 0.4 | 0.5 | 0.5 | 0.3 | — | 0.3 | 0.1 |
| MTBP | 0.3 | — | 0.1 | 0.4 | — | — | — | — |
| TBPM | — | 0.4 | — | — | — | 0.3 | — | — |
| Tinuvin 770 | — | — | — | — | — | — | — | 0.2 |
| $C_{14}$–$C_{16}$ fatty Acids | — | — | — | — | — | 0.3 | — | — |
| OTHER ADDITIVES | | | | | | | | |
| Enzyme | 0.4 | 0.6 | 1.0 | 0.6 | 0.5 | 0.6 | 0.5 | 0.9 |
| Sodium perborate tetrahydrate | 13 | 20 | 14 | 12 | 21 | 22 | 21 | 15 |
| Sodium perborate monohydrate | 2 | — | 5 | 3 | — | — | 2 | 7 |
| Dobanol 45-E-7 | 3 | 4 | — | 2 | 2 | 4 | 3 | 5 |
| Silicate | 8 | 5 | 7 | — | — | — | — | — |
| Sodium carbonate | 7 | 13 | — | 5 | 10 | — | 5 | — |
| Antioxidant prill | — | — | — | — | 0.8 | — | 0.9 | — |

The above products combine excellent bleach activator stability, substrate safety, water-dispersibility, granulometry and detergency performance across the range of wash temperatures and soil types.

Examples I, III and IV are repeated but with the antioxidant replaced by: 4,4′-methylenebis(2-6-di-t-butylphenol), 2,2′-methylenebis(4-methyl-6-(1-methylcyclohexyl) phenol), 4,4′-thiobis(6-t-butyl-3-methyl phenol), 4,4′-butylidene-bis(6-t-butyl-3-methylphenol), 6-t-butylhydroquinone, pyrogallol, 2,2′-methylene-bis(4-methyl-6-nonylphenol), 2,2′-iso-nonylene-bis(2,4-dimethylphenol), octadecyl 3-(3,5-di-t-butyl-4-hydroxyphenyl)propionate, tetrakis[methylene-3-(3′,5′-di-t-butyl-4′-hydroxyphenyl propionate)methane, the compounds of formula II wherein R and $R_1$ are t-butyl and $R_2$ is selected from $CH_2SCH_2CO_2H$, $Ch_2CH_2CO_2H$ and the $C_{18}$ alkyl esters thereof, 2,4-bis(n-octylthio)-6-(4-hydroxy-3,5-di-t-butylanilino)-1,3,5-triazine, 2-(2′-hydroxy-3′-t-butyl-5′-methylphenyl)-5-chlorobenzotriazole, tri(4-methyl-2,6-di-t-butylphenyl) metaborate or tri(4-methyl-2,6-di-t-butylphenyl) orthoborate. Improved performance is achieved.

Examples II and VI are repeated but with the antioxidant replaced by tri(4-methyl-2,6-di-t-butylphenyl) orthoborate, 4-methyl-2,6-di-t-butyl-di-isopropylorthoborate, di(4-methyl-2,6-di-t-butylphenyl)-n-butylorthoborate, 2,6-di-t-butylphenyl-di-isopropylorthoborate, di-(2,6-t-butylphenyl)-n-butylorthoborate or 4-methyl-2,6-di-t-butylphenyl-di-n-butylorthoborate. Improved performance is again achieved.

Examples VII is repeated but with the antioxidant replaced by 2,2′-methylenebis(4-methyl-6-t-butylphenol), 4,4′-methylenebis(2-6-di-t-butylphenol), 2,2′-methylenebis(4-methyl-6-(1-methycyclohexyl)phenol), 4,4′-thiobis(6-t-butyl-3-methyl phenol), 4,4′-butylidene-bis(6-t-butyl-3-methylphenol), 6-t-butylhydroquinone, pyrogallol, 2,2′-methylene-bis(4-methyl-6-nonylphenol), 2,2′-iso-nonylene-bis(2,4-dimethylphenol), octadecyl 3-(3,5-di-t-butyl-4-hydroxyphenyl)propionate, tetrakis[methylene-3-(3′,5′-di-t-butyl-4′-hydroxyphenyl propionate)methane, the compounds of formula II wherein R and $R_1$ are t-butyl and $R_2$ is selected from $CH_2SCH_2CO_2H$, $CH_2CH_2CO_2H$ and the $C_{18}$ alkyl esters thereof, tris-(2-methyl-4-hydroxy-5-t-butylphenyl)-butane, the compound of formula IV in which R is t-butyl, $R_1$ is 4-methyl, $R_5$ is dichloropentadiendieyl, and m averages about 1,2,4-bis(n-octylthio)-6-(4-hydroxy-3,5-di-t-butylanilino)-1,3,5-triazine, 2-(2′-hydroxy-3′-butyl-5′-methylphenyl)-5-chlorobenzotriazole, tri(4-methyl-2,6-di-t-butylphenyl)metaborate, tri(4-methyl-2,6-di-t-butylphenyl) orthoborate, 2,6-di-t-butyphenyl-di-iso-propylorthoborate, 4-methyl-2,6-t-dibutylphenyl-di-isopropylorthoborate, di(4-methyl-2,6-di-t-butylphenyl)-n-butylorthoborate, di-(2,6-t-butylphenyl)-n-butylorthoborate and 4-methyl-2,6-di-t-butylphenyl-di-n-butylorthoborate.

Example VII is repeated but the antioxidant prill is made by preparing a melt of BHT antioxidant at about 120° C., adding polyvinylpyrrolidone having a viscosity average molecular weight of about 9200 thereto at a weight ratio (PVP:BHT) of about 60:40, cooling to room temperature, comminuting to a weight average particle size of about 0.2–0.4 mm, admixing the PVP:BHT premix with sodium sulfate and thereafter agglomerating with polyethyleneglycol having a molecular weight of about 2000 to provide a final prill containing 50 parts of the PVP:BHT premix, 40 parts sodium sulfate and 10 parts polyethylene glycol. The agglomerate is added at a level of 0.5 parts in final composition. The composition displays excellent storage stability, subtrate safety and detergency performance.

Examples I to VIII are repeated and the resulting products are incorporated in twin-compartment sachets prepared as follows.

The sachets are made from a non-woven fabric formed of 100% unbleached crimped rayon fibres oof 1.5 denier bonded with 18% polyacrylate builder, the non-woven fabric having a basis weight of 35 g/m². The sachet is made from a sheet of the fabric measuring 120 mm×80 mm by folding midway along the long dimension, sealing along the two opposing free edges with sodium silicate solution and along a longitudinal seam parallel to and half-way between the two opposing edges, filling the two compartments with 120 cc each of the detergent composition and then sealing along the open edge of the sachet.

When used as main-wash laundry detergent products, the above examples again provide excellent bleach activator stability and substrate safety, water-dispersibility and detergency performance across the range of wash temperatures and soil types.

What is claimed is:

1. A bleach activator composition in the form of particles, comprising:

(a) from about 50% to about 99.9% by weight of a peroxyacid bleach precursor having the general formula I Ac—L I wherein Ac is the acyl moiety of an organic carboxylic acid comprising an optionally substituted, linear or branched $C_6$–$C_{20}$ alkyl or alkenyl moiety or a $C_6$–$C_{20}$ alkyl-substituted aryl moiety and L is a leaving group, the conjugate acid of which has a pKa in the range from about 4 to about 13, and (b) from about 0.1% to about 50% by weight of 4-methyl-2,6-di-t-butylphenol, and (c) from about 0.5% to 50% by weight of polyvinylpyrrolidone, wherein said 4-methyl-2,6-di-t-butylphenol is incorporated within said polyvinylpyrrolidone.

2. A bleach activator composition according to claim 1 wherein the weight ratio of 4-methyl-2,6-di-t-butylphenol to polyvinylpyrrolidone is in the range of from about 3:1 to about 1:6.

3. A bleach activator composition according to claim 2 wherein said range is from about 2:1 to about 1:3 and wherein said polyvinylpyrrolidone has a molecular weight of from about 3,000 to about 55,000.

4. A process of making a composition according to claim 2, comprising the steps of:

(a) incorporating 4-methyl-2,6-di-t-butylphenol in a polyvinylpyrrolidone carrier at a weight ratio of from about 3:1 to about 1:6, (b) comminuting the product of step (a) to a weight-average particle size of from about 2 mm to about 0.05 mm, (c) admixing the product of step (b) with a water-soluble, inorganic diluent, and (d) coating or agglomerating the product of step (c) with an organic coating or agglomerating material; wherein the final product comprises from about 20% to about 94% of said product of step (a), from about 5% to about 60% of said diluent, and from about 1% to about 20% of said coating or agglomerating material.

5. A detergent composition, comprising:

(a) from about 1% to about 75% of organic surfactant selected from anionic, nonionic, cationic, ampholytic and zwitterionic surfactants and mixtures thereof, (b) from about 0.5% to about 40% of peroxygen bleaching agent, and (c) from about 0.1% to about 20% of a bleach activator composition according to claim 1.

6. A detergent composition according to claim 5 wherein said bleach activator composition is made according to a process comprising the steps of:

(a) incorporating 4-methyl-2,6-di-t-butylphenol in a polyvinylpyrrolidone carrier, (b) comminuting the product of step (a) to a weight-average particle size of from about 2 mm to about 0.05 mm, (c) admixing the product of step (b) with a water-soluble, inorganic diluent, and (d) coating or agglolmerating the product of step (c) with an organic coating or agglomerating material; wherein the final product comprises from about 20% to about 94% of said product of step (a), from about 5% to about 50% of said diluent, and from about 1% to about 20% of said coating or agglomerating material.

* * * * *